US012175451B1

(12) United States Patent
Ford et al.

(10) Patent No.: US 12,175,451 B1
(45) Date of Patent: *Dec. 24, 2024

(54) PROCESSING A REAL TIME TRANSACTION USING JUST IN TIME FUNDING OF A PAYMENT CARD ACCOUNT FROM AN EXTERNAL FUNDING SOURCE

(71) Applicant: Marqeta, Inc., Oakland, CA (US)

(72) Inventors: Tony Ford, Pittsburg, CA (US); David Matter, San Rafael, CA (US); Daniel Osburn, Emeryville, CA (US); Jatin Salla, Fremont, CA (US)

(73) Assignee: Marqeta, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,538

(22) Filed: Jun. 28, 2022

Related U.S. Application Data

(63) Continuation of application No. 17/658,789, filed on Apr. 11, 2022, now Pat. No. 11,636,465, which is a
(Continued)

(51) Int. Cl.
*G06Q 20/00* (2012.01)
*G06Q 20/22* (2012.01)
(Continued)

(52) U.S. Cl.
CPC ......... *G06Q 20/349* (2013.01); *G06Q 20/227* (2013.01); *G06Q 20/3433* (2013.01);
(Continued)

(58) Field of Classification Search
CPC .................................................. G06Q 20/349
See application file for complete search history.

(56) References Cited

U.S. PATENT DOCUMENTS 6,044,360 A    3/2000   Picciallo
6,633,878 B1 * 10/2003   Underwood ........... G06Q 10/10
                                                                                                                   707/999.102

(Continued)

FOREIGN PATENT DOCUMENTS

WO    WO 2001/041026 A1    6/2001
WO    WO 2002/08996 A1    1/2002
WO    WO 2002/097752 A2    12/2002

OTHER PUBLICATIONS

On designing a flexible e-payment system with fraud detection capability IEEE 2004 (Year: 2004).*

(Continued)

*Primary Examiner* — Bruce I Ebersman
(74) *Attorney, Agent, or Firm* — Keller Preece PLLC (57) ABSTRACT

The present disclosure is directed to a system, method, and computer program for funding a payment card account from an external funding gateway just-in-time for a purchase. A payment card processing system maintains a payment card account for a user for funds from a third party funding source. Funds from the funding source are controlled by an external funding gateway. In order to approve a purchase authorization transaction, the payment card account must have a positive balance equal to or greater than the purchase amount. Funding requests are sent from the payment card processing system to the external funding gateway in response to receiving a purchase authorization request for the payment card, and, if the funding request is approved by the external funding gateway, the system credits to the payment card account with the funds just-in-time for approval of a purchase authorization request.

20 Claims, 4 Drawing Sheets

Related U.S. Application Data continuation of application No. 14/919,510, filed on Oct. 21, 2015, now abandoned.

(51) Int. Cl.
  *G06Q 20/34* (2012.01)
  *G06Q 20/40* (2012.01)
  *G06Q 40/00* (2023.01)
  *G06Q 20/08* (2012.01)

(52) U.S. Cl.
  CPC ........... *G06Q 20/405* (2013.01); *G06Q 40/00* (2013.01); *G06Q 20/08* (2013.01)

(56) References Cited

U.S. PATENT DOCUMENTS

| | | | |
|---|---|---|---|
| 6,834,039 B1* | 12/2004 | Kelly | H01Q 3/08 370/321 |
| 6,931,382 B2 | 8/2005 | Laage et al. | |
| 7,100,195 B1* | 8/2006 | Underwood | H04L 63/0823 707/999.009 |
| 7,318,048 B1 | 1/2008 | King | |
| 7,664,405 B2 | 2/2010 | Paulson | |
| 7,664,705 B2 | 2/2010 | Walker et al. | |
| 7,877,297 B2 | 1/2011 | Gould et al. | |
| 7,921,299 B1 | 4/2011 | Anantha et al. | |
| 8,191,766 B2 | 6/2012 | Tomchek et al. | |
| 8,249,985 B2 | 8/2012 | Giordano et al. | |
| 8,290,866 B1 | 10/2012 | Little | |
| 8,341,076 B1 | 12/2012 | Wilkes | |
| 8,442,914 B2 | 5/2013 | Killian et al. | |
| 8,447,670 B1 | 5/2013 | DeLoach | |
| 8,583,496 B2 | 11/2013 | Yoo et al. | |
| 8,612,346 B2 | 12/2013 | Foth et al. | |
| 8,626,642 B2 | 1/2014 | Foss, Jr. et al. | |
| 8,635,117 B1 | 1/2014 | Acuña-Rohter | |
| 9,406,085 B1* | 8/2016 | Hunt, III | G06Q 50/182 |
| 9,613,358 B1 | 4/2017 | Gardner | |
| 9,767,457 B1 | 9/2017 | Ford et al. | |
| 10,026,089 B2 | 7/2018 | Ford et al. | |
| 2002/0002485 A1 | 1/2002 | O'Brien et al. | |
| 2002/0033416 A1 | 3/2002 | Gerszberg et al. | |
| 2002/0052948 A1 | 5/2002 | Baudu et al. | |
| 2002/0073045 A1 | 6/2002 | Rubin et al. | |
| 2002/0169720 A1 | 11/2002 | Wilson et al. | |
| 2003/0142664 A1 | 7/2003 | Gerszberg et al. | |
| 2004/0103060 A1 | 5/2004 | Foth et al. | |
| 2004/0186773 A1 | 9/2004 | George et al. | |
| 2005/0080634 A1 | 4/2005 | Kanniainen et al. | |
| 2006/0078099 A1 | 4/2006 | Liebenow et al. | |
| 2006/0190412 A1 | 8/2006 | Ostroff | |
| 2006/0212407 A1 | 9/2006 | Lyon | |
| 2006/0224454 A1 | 10/2006 | Kantor et al. | |
| 2006/0235789 A1 | 10/2006 | Koch | |
| 2006/0271496 A1 | 11/2006 | Balasubramanian et al. | |
| 2007/0057043 A1* | 3/2007 | de la Garza Ortega | G06Q 20/341 235/380 |
| 2007/0063017 A1 | 3/2007 | Chen et al. | |
| 2007/0112655 A1 | 5/2007 | Jones | |
| 2007/0284436 A1 | 12/2007 | Gland | |
| 2008/0077506 A1 | 3/2008 | Rampell et al. | |
| 2008/0208747 A1 | 8/2008 | Papismedov et al. | |
| 2009/0078755 A1 | 3/2009 | Sullivan et al. | |
| 2009/0112651 A1* | 4/2009 | Atkinson | G06Q 40/02 705/75 |
| 2009/0164382 A1 | 6/2009 | Sally | |
| 2009/0171805 A1* | 7/2009 | Gould | G06Q 40/12 705/26.1 |
| 2009/0299841 A1 | 12/2009 | Bishop et al. | |
| 2010/0049599 A1 | 2/2010 | Owen et al. | |
| 2010/0057580 A1 | 3/2010 | Raghunathan | |
| 2010/0058156 A1 | 3/2010 | Hardy-Mcgee | |
| 2010/0094699 A1 | 4/2010 | Beal | |
| 2010/0161789 A1* | 6/2010 | Walia | G06Q 30/02 709/224 |
| 2010/0301113 A1 | 12/2010 | Bohn et al. | |
| 2010/0312629 A1 | 12/2010 | Wolf et al. | |
| 2011/0047038 A1 | 2/2011 | Halevi | |
| 2011/0191209 A1 | 8/2011 | Gould et al. | |
| 2011/0196753 A1* | 8/2011 | Hodgdon | G06Q 20/105 705/16 |
| 2012/0011063 A1* | 1/2012 | Killian | G06Q 20/349 705/41 |
| 2012/0046985 A1* | 2/2012 | Richter | G06Q 10/103 705/7.17 |
| 2012/0130787 A1 | 5/2012 | Stouffer et al. | |
| 2012/0173348 A1 | 7/2012 | Yoo et al. | |
| 2012/0215605 A1 | 8/2012 | Gardner et al. | |
| 2012/0253852 A1 | 10/2012 | Pourfallah et al. | |
| 2012/0330744 A1* | 12/2012 | Aissa | G06Q 20/387 705/14.38 |
| 2012/0330840 A1 | 12/2012 | Stinchcombe | |
| 2013/0065564 A1 | 3/2013 | Conner et al. | |
| 2013/0262307 A1 | 10/2013 | Fasoli et al. | |
| 2013/0262313 A1 | 10/2013 | Martin et al. | |
| 2013/0282565 A1 | 10/2013 | Barta et al. | |
| 2013/0290184 A1 | 10/2013 | Shapiro et al. | |
| 2013/0318348 A1 | 11/2013 | Lebron et al. | |
| 2014/0040129 A1 | 2/2014 | Akin | |
| 2014/0096261 A1 | 4/2014 | Boldyrev et al. | |
| 2015/0127457 A1 | 5/2015 | Feldman | |
| 2015/0363771 A1 | 12/2015 | Graylin et al. | |
| 2016/0086160 A1* | 3/2016 | Desai | G06Q 20/3223 705/41 |
| 2016/0189229 A1* | 6/2016 | Gopalan | G06Q 30/0261 705/14.58 |
| 2016/0342549 A1* | 11/2016 | Hathorn | G06F 3/067 |

OTHER PUBLICATIONS

A study on a new bank card operation model—"Dual-account card" IEEE 2011 (Year: 2011).*
On designing a flexible e-payment system with fraud detection capability, IEEE (Year: 2004).*
Centralized Payment System Using Social Networks Account IEEE (Year: 2014).*
Yingjiu Li and Xinwen Zhang, "A security-enhanced one-time payment scheme for credit card," 14th International Workshop Research Issues on Data Engineering: Web Services for e-Commerce and e-Government Applications, 2004. Proceedings., 2004, pp. 40-47, doi: 10.1109/RIDE.2004.1281701.
Learning and Trust in Auction Markets (Year: 2017).
Improving the Efficiency of Blockchain Applications with Smart Contract based Cyber-insurance (Year: 2020).
U.S. Appl. No. 14/919,510, Aug. 24, 2018, Office Action.
U.S. Appl. No. 14/919,510, Sep. 19, 2019, Office Action.
U.S. Appl. No. 14/919,510, Jul. 23, 2019, Office Action.
U.S. Appl. No. 14/919,510, Dec. 9, 2019, Office Action.
U.S. Appl. No. 14/919,510, Jun. 23, 2020, Office Action.
U.S. Appl. No. 17/658,789, Jun. 22, 2022, Office Action.
U.S. Appl. No. 14/919,510, Oct. 4, 2022, Decision on Appeal.
On designing a flexible e-payment system with fraud detection capability CEC 2004 (Year: 2004).
Secure Digital Payments IEEE press 1999 Year: 1999).
U.S. Appl. No. 17/658,789, Sep. 28, 2022, Office Action.
U.S. Appl. No. 17/658,789, Feb. 22, 2023, Notice of Allowance.

* cited by examiner

PROCESSING A REAL TIME TRANSACTION USING JUST IN TIME FUNDING OF A PAYMENT CARD ACCOUNT FROM AN EXTERNAL FUNDING SOURCE

CROSS-REFERENCE TO RELATED APPLICATIONS

The present application is a continuation of U.S. application Ser. No. 17/658,789 filed on Apr. 11, 2022 which is a continuation of U.S. application Ser. No. 14/919,510, filed on Oct. 21, 2015. The aforementioned applications are hereby incorporated by reference in their entirety.

BACKGROUND OF THE INVENTION

Field of the Invention

This invention relates generally to a payment card system and, more particularly, to a system and method for funding a payment card account from an external source just-in-time for a purchase.

Background

When a user desires to make a purchase using a funding source, such as home equity line or other loan, the user typically must either transfer funds from the funding source into his bank account or use a debit card processed by the funding source (e.g., a bank). In the case of the former, this requires preplanning by the user prior to the purchase, and it also requires a user to estimate the amount of the purchase. If the funding source is a loan, this results in interest accruing before the time of the purchase, and, as the user is likely to transfer more than the amount of an estimated purchase, in the user paying more interest than is necessary.

Because of the disadvantages of transferring funds from a funding source to a bank account in advance, it is often desirable for the user to have a payment card in which funds from the funding source can be used on demand and only in the amounts needed. However, many funding sources do not have their own payment card processing systems. If they contract with a traditional payment card processor, they have to hand over control of funds to the payment card processor. Therefore, there is a need for a system that enables funding source recipients to have the convenience of a payment card without requiring a funding source to be a payment card processor or to hand over control of funds to a payment card processor.

SUMMARY OF THE DISCLOSURE

The present disclosure is directed to a system, method, and computer program for funding a payment card account from an external funding gateway just-in-time for a purchase. A payment card processing system maintains a payment card account for a user for funds from a third party funding source. The funds from the third party funding source are the only source of funds for the account, and the payment card processing system does not control or hold funds for the third party funding source. Funds from the third party funding source are credited to the payment card account only just-in-time for approval of a purchase authorization request. This enables users to use funds from a funding source on demand and only in the amounts needed.

In response to a user using the payment card for a purchase, a transaction authorization request for the payment card account is forwarded to payment card processing system via a payment card network (e.g., DISCOVER, VISA, etc.). The payment processing system generates and sends a funding request in real time for the transaction to a third party funding gateway, which may be the third party funding source itself or an entity that services user accounts for the funding source (e.g., determines whether to authorize funds for a purchase). The funding request is for funds equal to the amount of the purchase transaction.

In response to the third party funding gateway approving the funding request, the payment card processing system adjusts the available balance of the payment card to reflect the amount of the funding and approves the purchase authorization request. If the third party gateway declines the funding request, then the payment card processing system declines the transaction. All transaction authorization requests have a response deadline (e.g., 6 seconds) in which the payment card processing system must authorize or decline the request, and, therefore, communications with the funding gateway happen in real time.

In certain embodiments, a payment card may be associated with multiple funding gateways, and, in such embodiments, the system maintains a separate subaccount (or purse) for each funding gateway on the payment card.

DETAILED DESCRIPTION OF THE PREFERRED EMBODIMENTS

Figure 1:
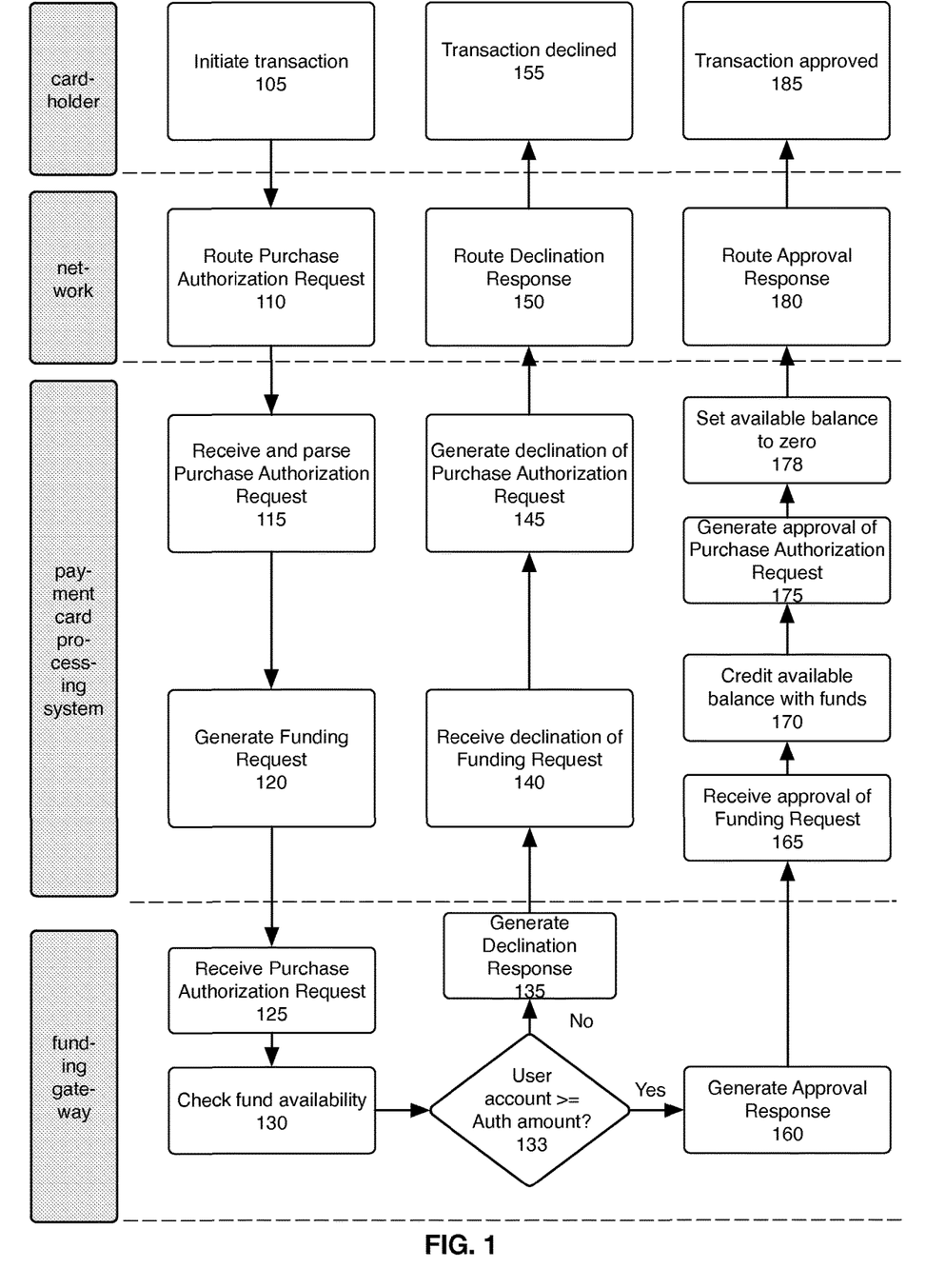
FIG. 1 is a flowchart that illustrates a method, according to one embodiment of the disclosure, for funding a payment card account from an external funding source just-in-time for a purchase transaction.
Figure 2:
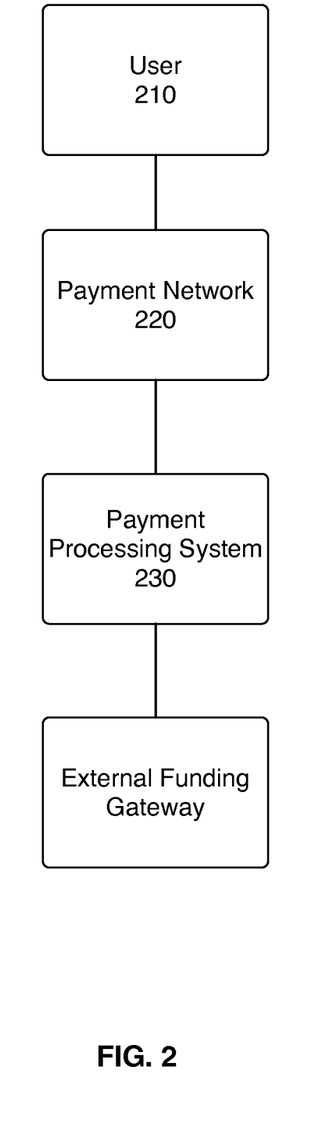
FIG. 2 is a diagram of a payment card network according to one embodiment of the invention.

FIG. 1 illustrates a method, performed by a payment card processing system, for funding a payment card account from an external funding source just-in-time for a purchase transaction. The funding source is external in that it is not controlled by or under common control with the payment processing system. Examples of external funding sources are a loan or line of credit from a bank or other creditor, or a multi-currency wallet. The method is described with respect to network 200.

A user 210 initiates a transaction online, at a physical store, at an ATM, or elsewhere using a payment card that enables the user to use a third party funding source for the transaction (step 105). A purchase authorization request is routed to a payment card processing system 230 via a payment network 220 (step 110). The payment network 220 is a network that routes payment card communications between merchants (and Merchant Acquirers) and payment card processing systems (e.g., system 230), which are the systems that process transactions for payment cards and maintain payment card balances.

The payment processing system 230 receives and parses the transaction authorization request (step 115). In order to approve a purchase authorization request, the system 230 requires a positive balance in an account sufficient to cover the purchase amount, and, at the time of receipt of the purchase authorization request, the payment card account has a balance of zero (except, in certain cases, there may be funds from a return of an item). This is because the sole source of funds for the payment card account is the external funding source, and the payment payment process system 230 neither holds nor controls the external funds. Consequently, the payment processing system 230 generates a funding request for the transaction (step 120). The amount of funding requested is equal to the purchase price in the purchase authorization request. It then sends the funding request to a third party funding gateway 240 (the "funding gateway"). The request is generated and sent in real time, as there is a time deadline to respond to the the purchase authorization request, typically seven seconds.

The funding gateway 240 may be the funding source itself (e.g., a bank that granted the user a loan), or it may be a company that manages or services user accounts for a funding source. The funding gateway 240 determines whether the user has sufficient funds for the purchase (or whether the user is otherwise authorized to use funds for the purchase) (steps 125, 130, 133)), and responds to the funding request from the payment card processing system accordingly (steps 135, 160). In one embodiment, the funding gateway 240 must respond to the funding request within three seconds.

In response to the funding gateway 240 declining the funding request, the payment card processing system 230 declines the purchase authorization request prior to the payment network 220 deadline (e.g., 7 seconds) for responding to such request (steps 140-155) (i.e., the payment card processing system 230 sends a declination response to the user/merchant via the payment network 220). In response to the funding gateway 240 approving the funding request, the payment card processing system 230 adjusts the available balance of the payment card account to reflect the amount of the funding request (i.e., the purchase amount) and approves the transaction authorization request prior to the payment network 220 deadline for responding to such request (steps 160-185) (i.e., the payment card processing system 230 sends an approval request to the user/merchant via the payment card network). The available balance of the payment card account is adjusted "just in time" to approve the purchase authorization request (see step 170). As the payment card processor does not extend credit to the user itself, the available balance in the payment card account must be at least equal to the purchase amount in order to approve the purchase authorization request (unless partial authorizations are permitted). Upon approving the purchase authorization request, the available balance in the payment card account is returned to zero (see step 178).

In one embodiment, when the transaction is settled, the payment card processing system sends funds for the purchase to the merchant (or merchant acquirer), and the third party funding gateway sends an equivalent amount of funds to the payment card processing system.

In one embodiment, the payment card processing system processes transactions for prepaid payment cards, such as the system described in U.S. Patent Publication No. US-2012-0215605-A1, filed on Feb. 21, 2012 with Ser. No. 13/400,888 and titled "System and Method for Providing a User with a Single Payment Card on which Prepaid and/or Reward Balances Are Tracked for Multiple Merchants," the contents of which are incorporated by reference as if fully disclosed herein. In such a system, the payment card account for external funds is treated like a prepaid account that is funded just-in-time for a purchase.

In certain embodiments, a single payment card has multiple types of accounts associated with it. For example, there may be an account for funds from an external funding source (as discussed above), as well as prepaid accounts/purses, multi-currency wallets, and credit card accounts. In such cases, the system separately tracks balances and payments for each account associated with the payment card.

In certain embodiments, a payment card may be associated with multiple funding sources, and, in such embodiments, the system maintains a separate subaccount for each funding source. In such case, the user may declare his preferred funding account in advance of the payment card transaction.

If a user returns an item purchased with payment card account (i.e., with funds from the funding source), the refunded amount may be passed on to the funding gateway or held in the user's prepayment card account, depending on funding gateway and how the payment card processing system is configured. In embodiments in which refunds are help in the prepayment card account, the account balance is first checked in response to receiving a purchase authorization request for the prepayment card. If the balance covers the purchase price, the purchase authorization request is approved without a call to the funding gateway. However, the sole source of funds for the account is still the external funding source, as the refunded amount originated from the external funding source.

As used herein, a payment card may be a physical card, an electronic card, or any other payment device that a user can use to purchase goods and services.

Figure 3A:
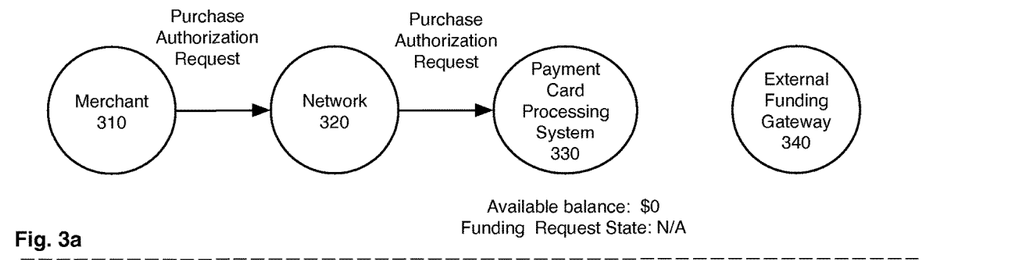
FIGS. 3a-e are a sequence flows that illustrates an example transaction according to one embodiment.

FIGS. 3a-3e illustrates an example of the method described with respect to FIG. 1. In this example, the user desires to user the payment card for a $100 purchase. In FIG. 3a, a merchant acquirer 320 sends the payment card processing system 340 a purchase authorization request for a $100 purchase. The request is sent via payment network 320. At this time the user's account balance on the payment card is zero.

Figure 3B:
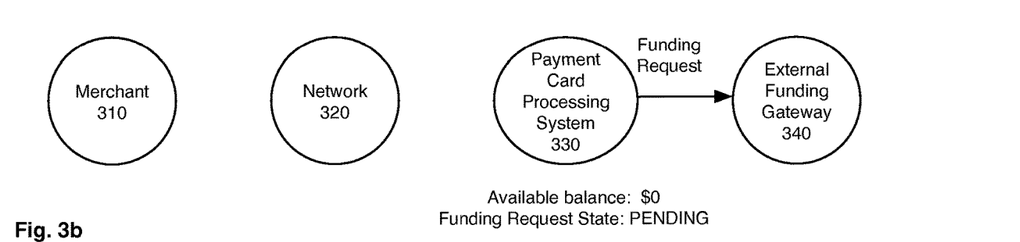

In FIG. 3b, the payment card processing system 330 sends a funding request to the funding gateway 340. At this time, the user account balance is still zero. A state is associated with the funding request, and, at this point, the state indicates that the funding request is pending.

Figure 3C:
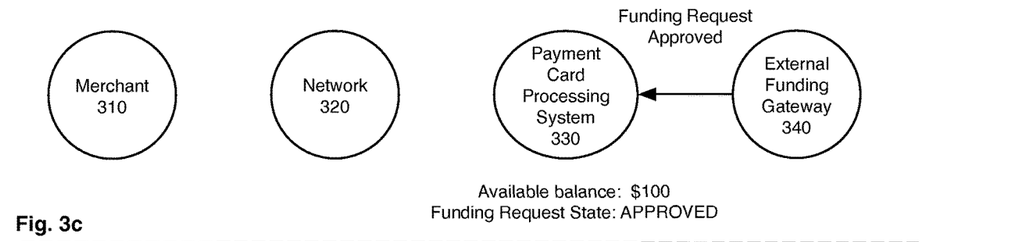

In FIG. 3c, the payment card processing system receives approval of the funding request from the funding gateway 350. The payment card processing system adjusts the available balance for the payment card to $100 and changes the funding request state indicating that the funding request was approved.

Figure 3D:
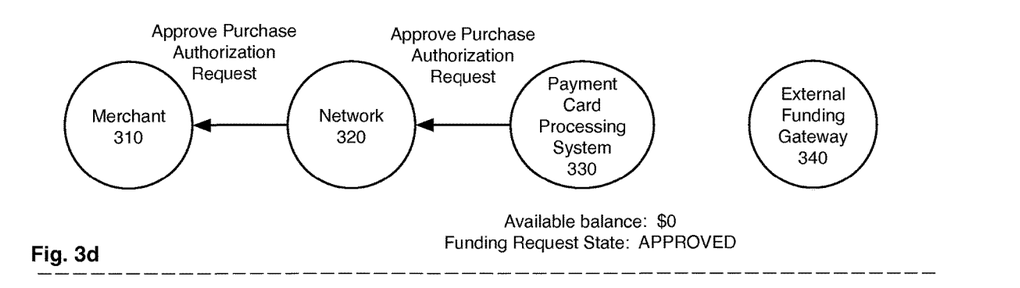
Figure 3E:
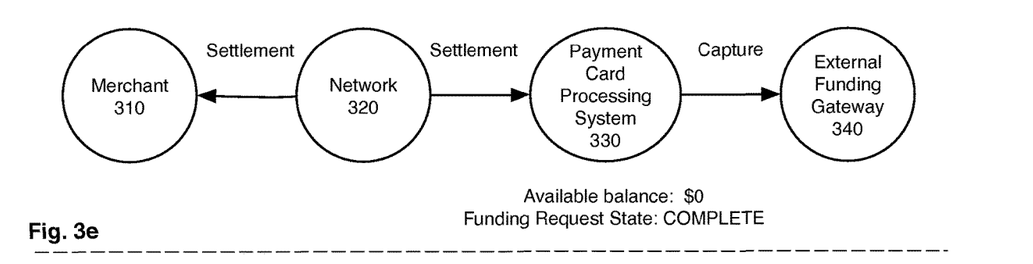

In FIG. 3d, the payment card processing system 330 approves the purchase authorization request and sets the account balance to $0. The state of the funding request continues to indicate that the funding request is approved In FIG. 3e, the transaction is cleared and settled. The account balance is still $0 and the state of the funding request indicates the transaction is complete and settled.

The methods described with respect to FIGS. 1-3 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

What is claimed is:

1. A computer-implemented method comprising:
   receiving, by one or more processors of one or more computing devices of a payment card processing system, a transaction authorization request from a payment network;
   parsing, by the one or more processors of the one or more computing devices of the payment card processing system, the transaction authorization request to determine a transaction amount and a first response time deadline for the payment card processing system to respond to the payment network, wherein the first response time deadline corresponds to the transaction authorization request;
   sending, by the one or more processors of one or more computing devices of the payment card processing system to one or more computing devices of an external gateway separate from the payment card processing system, a funding request to authorize and fund an electronic payment transaction for the transaction amount according to the first response time deadline based on a payment card account at the payment card processing system comprising a funding source external to the payment card processing system, wherein the funding request corresponds to a second response time deadline indicating an amount of time less than the first response time deadline associated with the transaction authorization request to fund the electronic payment transaction for the transaction amount on demand utilizing the funding source via the external gateway;
   receiving, by the one or more processors of the one or more computing devices of the payment card processing system from the external gateway, an approval of the funding request for the transaction amount of the transaction authorization request within the second response time deadline;
   modifying, by the one or more processors of the one or more computing devices of the payment card processing system in response to the approval of the funding request, a balance of the payment card account by increasing, in real-time, the balance of the payment card account according to the transaction amount;
   modifying, by the one or more processors of the one or more computing devices of the payment card processing system, the balance of the payment card account by decreasing, in real-time, the balance of the payment card account by the transaction amount in connection with generating an approval response indicating the approval of the funding request; and
   sending, by the one or more processors of the one or more computing devices of the payment card processing system to the payment network corresponding to the transaction authorization request, the approval response indicating the approval of the funding request prior to the first response time deadline.

2. The computer-implemented method of claim 1, further comprising:
   sending, to the external gateway from the payment card processing system, the funding request for the external gateway to fund the electronic payment transaction, the external gateway comprising the funding source.

3. The computer-implemented method of claim 1, further comprising:
   sending, to the external gateway from the payment card processing system, the funding request for the external gateway to determine whether the funding source has sufficient funds for the transaction amount.

4. The computer-implemented method of claim 1, further comprising, in connection with settling the electronic payment transaction, sending funds for the transaction amount to a merchant via the payment network and receiving equivalent funds for the transaction amount from the external gateway.

5. The computer-implemented method of claim 1, wherein decreasing the balance of the payment card account comprises generating the approval response in response to determining that the balance of the payment card account is equal to or greater than the transaction amount.

6. The computer-implemented method of claim 1, wherein decreasing the balance of the payment card account comprises returning the balance of the payment card account to zero according to the transaction amount of the transaction authorization request.

7. The computer-implemented method of claim 1, wherein decreasing the balance of the payment card account comprises:
   generating the approval response indicating the approval of the funding request in response to increasing the balance of the payment card account according to the transaction amount; and
   reducing the balance of the transaction amount by the transaction amount in response to generating the response indicating the approval of the funding request.

8. The computer-implemented method of claim 1, wherein decreasing the balance of the payment card account comprises:
   determining that the approval of the funding request comprises approval of a partial amount of the transaction amount; and
   decreasing the balance of the payment card account by the partial amount.

9. A system comprising:
   at least one processor; and
   a non-transitory computer readable storage medium comprising instructions that, when executed by the at least one processor, cause the system to:
   receive, by one or more processors of one or more computing devices of a payment card processing system, a transaction authorization request from a payment network;
   parse, by the one or more processors of the one or more computing devices of the payment card processing system, the transaction authorization request to determine a transaction amount and a first response time deadline for the payment card processing system to respond to the payment network, wherein the first response time deadline corresponds to the transaction authorization request;
   send, by the one or more computing devices of the payment card processing system to one or more computing devices of an external gateway separate from the payment card processing system, a funding request to authorize and fund an electronic payment transaction for the transaction amount according to the first response time deadline based on a payment card account at the payment card processing system comprising a funding source external to the payment card processing system, the funding request with a second response time deadline indicating an amount of time less than the first response time deadline associated with the transaction authorization request to fund the electronic payment transaction for the transaction amount on demand utilizing the funding source via the external gateway;

receive, by the one or more computing devices of the payment card processing system from the external gateway, an approval of the funding request for the transaction amount of the transaction authorization request within the second response time deadline;

modify, by the one or more computing devices of the payment card processing system in response to the approval of the funding request, a balance of the payment card account by increasing, in real-time, the balance of the payment card account according to the transaction amount;

modify, by the one or more computing devices of the payment card processing system, the balance of the payment card account by decreasing, in real-time, the balance of the payment card account by the transaction amount in connection with generating an approval response indicating the approval of the funding request; and send, by the one or more computing devices of the payment card processing system to the payment network corresponding to the transaction authorization request, the approval response indicating the approval of the funding request prior to the first response time deadline.

10. The system of claim 9, further comprising instructions that, when executed by the at least one processor, causes the system to:

generate, in response to receiving and parsing the transaction authorization request from the payment network, the funding request for the external gateway to authorize the electronic payment transaction for the transaction amount with the second response time deadline based on the first response time deadline of the transaction authorization request.

11. The system of claim 10, further comprising instructions that, when executed by the at least one processor, causes the system to send the funding request to determine whether the funding source has sufficient funds for the transaction amount.

12. The system of claim 10, further comprising instructions that, when executed by the at least one processor, causes the system to increase the balance of the payment card account by increasing, prior to receiving funds for the transaction amount from the external gateway, the balance of the payment card account by the transaction amount within the first response time deadline.

13. The system of claim 12, further comprising instructions that, when executed by the at least one processor, causes the system to decrease the balance of the payment card account by decreasing, prior to sending funds for the transaction amount to the payment network, the balance of the payment card account by the transaction amount within the first response time deadline.

14. The system of claim 10, further comprising instructions that, when executed by the at least one processor, causes the system to:

generate the approval response indicating the approval of the funding request in response to increasing the balance of the payment card account according to the transaction amount; and decrease the balance of the payment card account by the transaction amount in response to generating the approval response indicating the approval of the funding request.

15. The system of claim 10, further comprising instructions that, when executed by the at least one processor, causes the system to increase the balance of the payment card account by:

maintaining, at the payment card processing system, a plurality of subaccounts corresponding to a plurality of funding sources for the payment card account; and modifying the balance of the payment card account by modifying a subaccount of the plurality of subaccounts according to the funding source.

16. The system of claim 10, further comprising instructions that, when executed by the at least one processor, causes the system to decrease the balance of the payment card account by:

determining that the balance of the payment card account is equal to or greater than the transaction amount; and decreasing the balance of the payment card account in response to determining that the balance of the payment card account is equal to or greater than the transaction amount.

17. A non-transitory computer readable storage medium comprising instructions that, when executed by at least one processor, cause a computing device to:

receive, by one or more processors of one or more computing devices of a payment card processing system, a transaction authorization request from a payment network;

parse, by the one or more processors of the one or more computing devices of the payment card processing system, the transaction authorization request to determine a transaction amount and a first response time deadline for the payment card processing system to respond to the payment network, wherein the first response time deadline corresponds to the transaction authorization request;

send, by the one or more computing devices of the payment card processing system to one or more computing devices of an external gateway separate from the payment card processing system, a funding request to authorize and fund an electronic payment transaction for the transaction amount according to the first response time deadline based on a payment card account at the payment card processing system comprising a funding source external to the payment card processing system, the funding request with a second response time deadline indicating a sub time period of an amount of time less than the first response time deadline associated with the transaction authorization request to fund the electronic payment transaction for the transaction amount on demand utilizing the funding source via the external gateway;

receive, by the one or more computing devices of the payment card processing system from the external gateway, an approval of the funding request for the transaction amount of the transaction authorization request within the second response time deadline;

modify, by the one or more computing devices of the payment card processing system in response to the approval of the funding request, a balance of the payment card account by increasing, in real-time, the balance of the payment card account according to the transaction amount;

modify, by the one or more computing devices of the payment card processing system, the balance of the payment card account by decreasing, in real-time, the payment card account by the transaction amount in connection with generating an approval response indicating the approval of the funding request; and send, by the one or more computing devices of the payment card processing system to the payment network corresponding to the transaction authorization request, the approval response indicating the approval of the funding request prior to the first response time deadline.

18. The non-transitory computer readable storage medium of claim 17, further comprising instructions that, when executed by the at least one processor, causes the computing device to:

generate, in response to receiving and parsing the transaction authorization request from the payment network, the funding request with the second response time deadline with the second response time deadline based on the first response time deadline of the transaction authorization request; and receive the approval of the funding request within the first response time deadline and the second response time deadline.

19. The non-transitory computer readable storage medium of claim 17, further comprising instructions that, when executed by the at least one processor, causes the computing device to:

increase, prior to receiving funds for the transaction amount from the external gateway, the balance of the payment card account by the transaction amount; and decrease, prior to sending funds for the transaction amount to the payment network, the balance of the payment card account by the transaction amount.

20. The non-transitory computer readable storage medium of claim 17, further comprising instructions that, when executed by the at least one processor, causes the computing device to:

generate the approval response indicating the approval of the funding request in response to increasing the balance of the payment card account; and decrease the balance of the payment card account in response to generating the approval response indicating the approval of the funding request.

\* \* \* \* \*